United States Patent [19]
DeRees et al.

[11] Patent Number: 5,222,372
[45] Date of Patent: Jun. 29, 1993

[54] MODULAR VEHICLE AIR CONDITIONING/HEATER ASSEMBLY

[76] Inventors: Delbert D. DeRees, 439 Morton St., Romeo, Mich. 48065; Brian R. Bills, 2512 Grandview, Waterford, Mich. 48329

[21] Appl. No.: 956,142

[22] Filed: Oct. 5, 1992

[51] Int. Cl.$^5$ .............................. F25D 15/00
[52] U.S. Cl. ............................ 62/237; 62/244; 62/298; 62/323.3
[58] Field of Search ............... 62/244, 298, 302, 323.1, 62/323.3, 237

[56] References Cited

U.S. PATENT DOCUMENTS

| | | | |
|---|---|---|---|
| 2,263,476 | 11/1941 | Sunday | 62/323.1 X |
| 3,766,749 | 10/1973 | Livesay | 62/298 X |
| 3,996,762 | 12/1976 | Calme et al. | 62/237 |
| 4,608,834 | 9/1986 | Rummel | 62/244 |
| 4,672,818 | 6/1987 | Roth | 62/244 X |

Primary Examiner—William E. Tapolcai
Attorney, Agent, or Firm—Kenneth H. MacLean

[57] ABSTRACT

For a vehicle, a unitary vehicle air conditioning and heater assembly with the operative parts of the air conditioning system within a housing enclosure which has various openings therethrough for selective air flow into and out of the enclosure. The vehicle has interior body panel means between the engine compartment and the passenger compartment which form a deep recess which opens into the engine compartment for insertion/removal of the assembly. The enclosure has various openings therethrough for air flow and the configuration of the recess and housing enclosure are so that the housing enclosure can be readily fitted into and removed from the recess including alignment of the various openings.

6 Claims, 2 Drawing Sheets

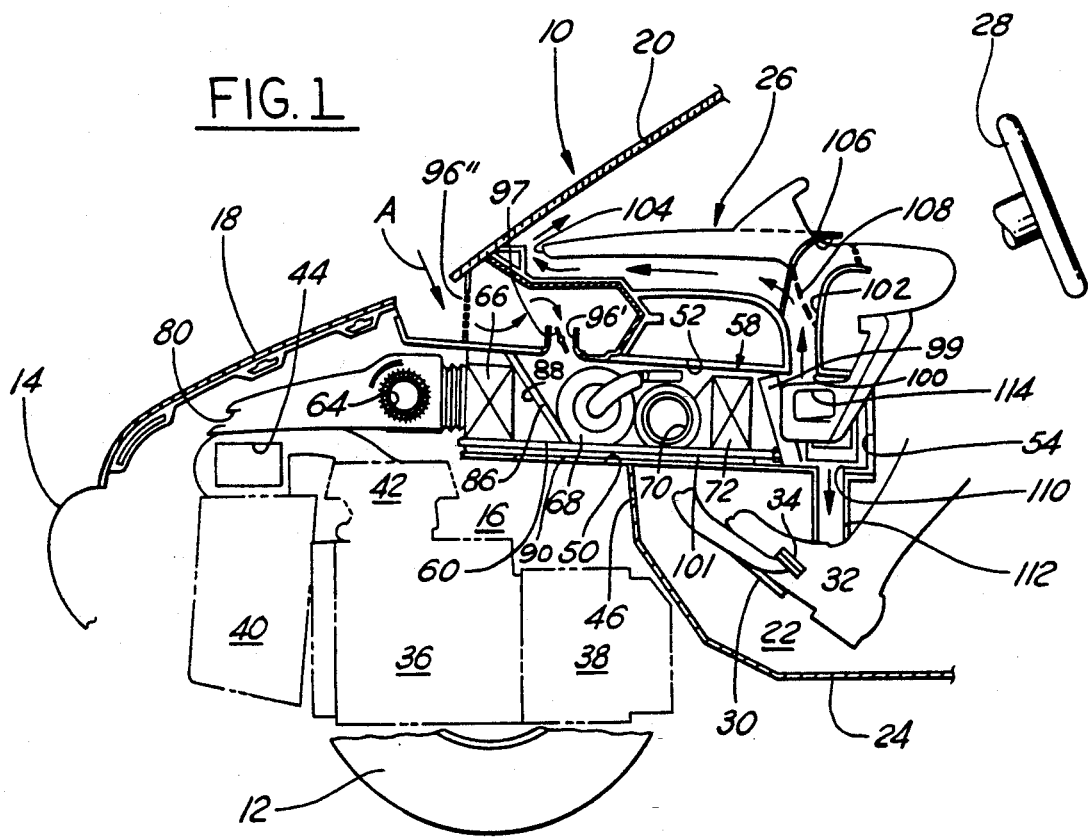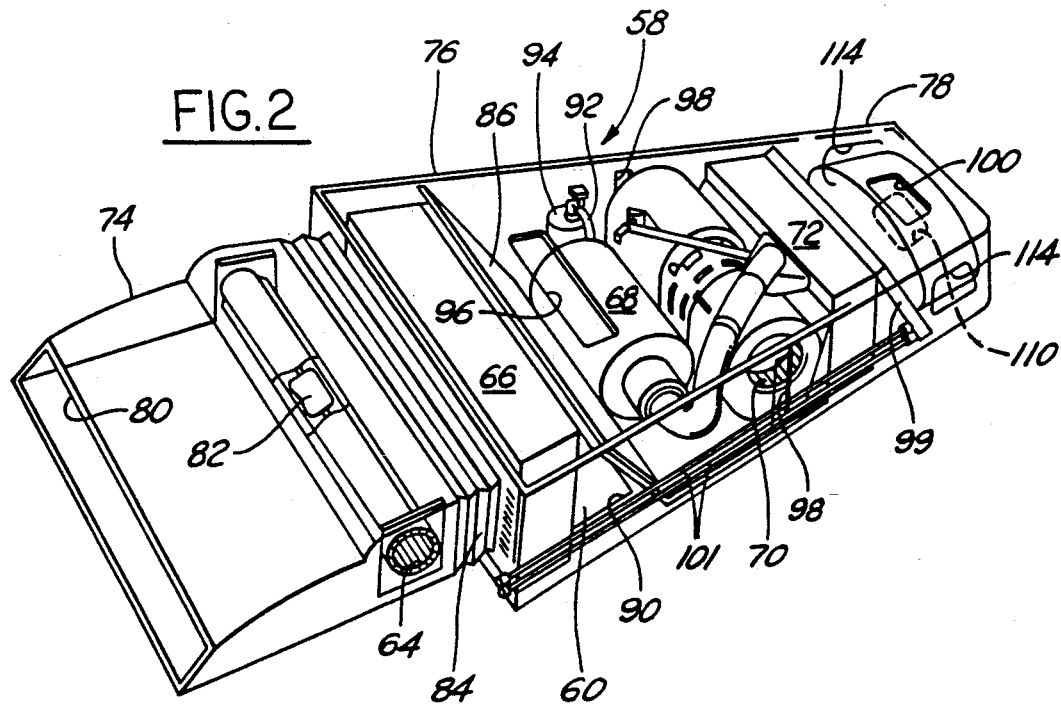

MODULAR VEHICLE AIR CONDITIONING/HEATER ASSEMBLY

BACKGROUND OF THE INVENTION

1. Field of the Invention

This application concerns an improved vehicle air conditioning/heater system with operative components; compressor, condenser, evaporator, heater core and fans housed within a single enclosure adapted to insertably fit within a recess formed in a vehicle panel separating the engine compartment from the passenger compartment. The enclosure has openings therethrough which align with similar openings in the vehicle panel when the enclosure is insertably installed in the vehicle to allow air to flow into and out of the enclosure.

2. Description of Related Art

There have been previous attempts to provide a unitary or modular type air conditioning system in a vehicle. Trucks in particular have provided refrigeration units. Such units are shown in U.S. Pat. Nos. 2,363,974; 2,630,687; 2,735,277; 3,057,171; 3,475,919; and 4,217,764. These truck type units are satisfactory for trucks where there is sufficient space for relatively bulky units. Also, in trucks there is little objection to mounting the unit on the roof or some other exposed location which would be objectionable for a passenger car. Thus, the air conditioning units disclosed by these patents are not particularly applicable for the subject modular air conditioning assembly. An interesting application of air conditioning to busses is disclosed in U.S. Pat. No. 2,185,034 which includes most but not all of the air conditioning components in a removable unit. The stationary air conditioning unit disclosed in U.S. Pat. No. 2,738,655 is even more inapplicable to passenger car use but does combine the air conditioning components in a unitary package.

Previous patents have disclosed modular type air conditioning units for passenger type vehicles which includes usual cars such as coupes and sedans and in addition includes small vans (minivans) as well as sport utility vehicles. U.S. Pat. Nos. 2,479,170 and 2,743,589 to Kuempel disclose modular units adapted to be supported in the rear of the passenger compartment adjacent the front seat back (FIG. 1) and in the truck of a passenger car, respectively. U.S. Pat. No. 2,760,347 to Dolza discloses a unit which mounts on the engine with tubing to distribute air to the passenger compartment. Likewise, the U.S. Pat. No. 4,909,046 mounts the air conditioning components as a unit on the engine. The unit in U.S. Pat. No. 4,945,977 is mounted under the floor of the vehicle.

SUMMARY OF THE INVENTION

This application discloses a modular air conditioning assembly for a vehicle particularly adapted to carry passengers as opposed to cargo. The air conditioning components include: an electric motor driven refrigerant compressor, a condenser, an evaporator, and first and second electric motor driven fans. The components are contained in an improved housing enclosure having openings therethrough forming an air inlet and outlet associated with the condenser and an air inlet and outlet associated with the evaporator. The enclosure is carried by the passenger vehicle by mounting the enclosure in a recess formed by an interior body panel of the vehicle separating the engine compartment from the passenger compartment. The interior body panel has openings therethrough adapted to align with the openings in the enclosure when the enclosure is insertably installed into the recess from the engine compartment.

Therefore, an object or advantage of the subject modular air conditioning assembly are its compactness and unitary nature which permits the assembly to be readily removed from the vehicle for service.

Another advantage of the subject modular assembly is the convenience of access for installing and removing the unit from the engine compartment as opposed to access from the passenger compartment which offers less space and has interfering structures such as the steering wheel, the instrument panel, and other portions of the dashboard.

A still further advantage of the installation of the subject modular assembly in a recess formed in an interior body panel is the ease in installation and removal of the assembly from the vehicle without multiple tubing connections for air flow.

Other objectives and advantages will be more readily apparent after a reading of the following detailed description of a preferred embodiment.

IN THE DRAWINGS

FIG. 1 is an elevational view of the forward portion of a passenger type auto or van, partially in section, showing the subject air conditioning modular assembly in an installed position; and FIG. 2 is a perspective view of the subject modular air conditioning assembly with its housing enclosure removed from the associated vehicle; and FIG. 3 is a view similar to FIG. 1 but with the subject modular air conditioning assembly shown in an uninstalled position either just prior to insertion or removal from the recess in which it is associated.

DETAILED DESCRIPTION OF A PREFERRED EMBODIMENT

Figure 3:
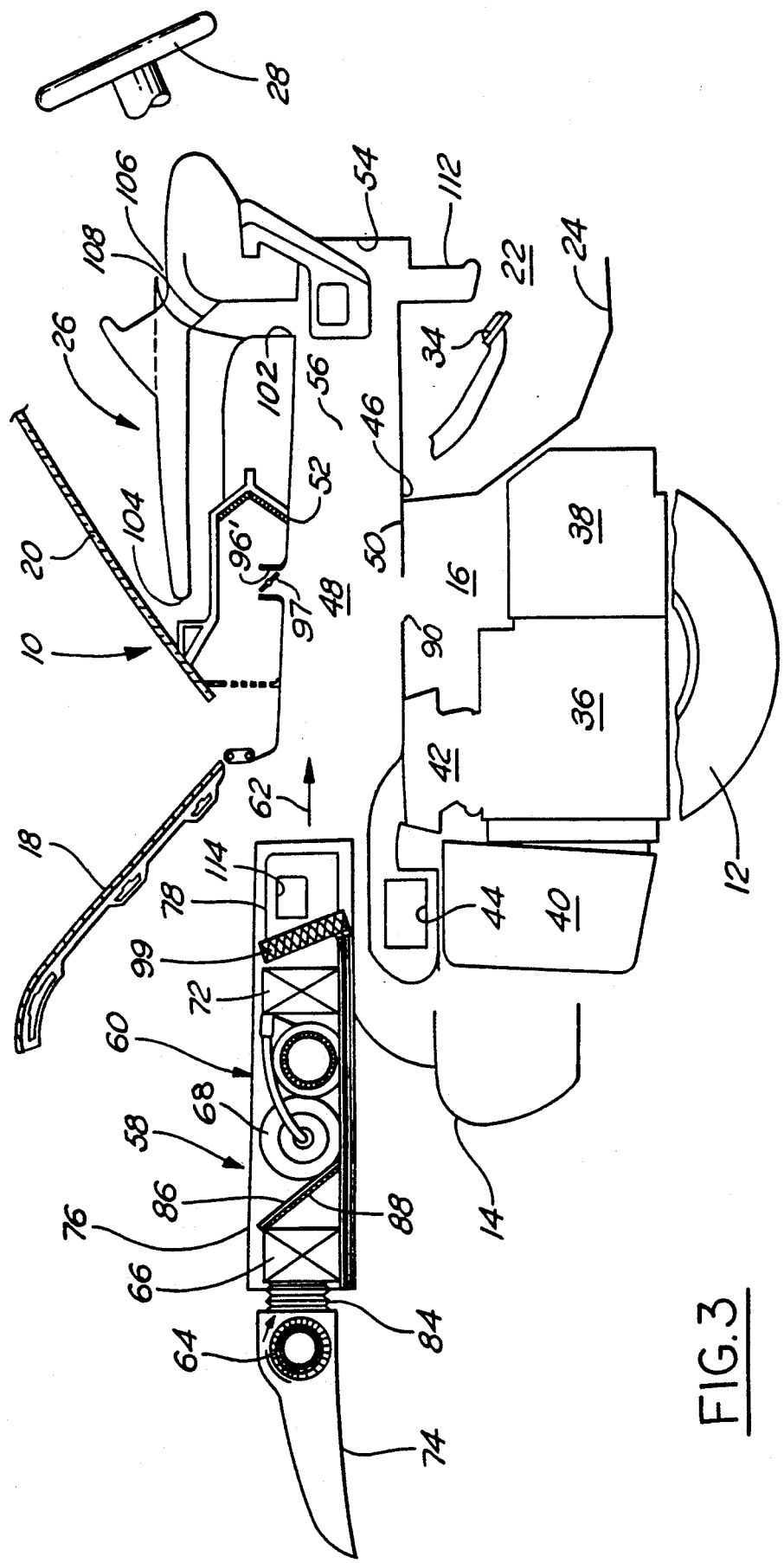

In FIGS. 1 and 3, a passenger type vehicle 10 is shown including one 12 of two front wheels, a front bumper structure 14, an engine compartment 16 with pivotal hood 18, a windshield 20, passenger compartment 22, floor 24, dashboard assembly 26 including an instrument panel, steering wheel 28, throttle peddle 30 (actuated by foot 32 in FIG. 1), and parking brake lever assembly 34. An engine 36 and transmission 38 are shown in outline. An engine cooling fan and radiator assembly 40 attached to the engine are shown in outline. The engine 36 includes an air inlet and filter assembly 42 adapted to receive outside air through an inlet opening 44.

The engine compartment 16 is separated from the passenger compartment 22 by means including interior body panel means 46. Panel 46 may be integral with a floor portion 24. The panel means 46 extends upward from the floor portion and terminates at the base of the windshield 20 at its upper edge portion. A dashboard assembly 26 covers the upper portion and includes an instrument panel. As best shown in FIG. 3, the body panel 46 includes structure forming a deep recess or pocket 48 (see FIG. 3). The recess 48 may include a lower wall 50, an upper wall 52, an end wall 54 and side walls 56, only one of which is visible in the sectioned view. The recess 48 is connected to or integrally a part of the panel 46 and walls 50, 52, and 56 are partially in the engine compartment 16 and partially in the passenger compartment 22.

As is obvious from examination of FIGS. 1 and 3, recess 48 is configured to receive an unitary or modular air conditioning assembly 58. Assembly 58 has a basically hollow and elongated housing enclosure 60 which is configured similarly to recess 48 so that housing enclosure 60 can be insertably installed therein along direction line 62 in FIG. 3. The enclosure 60 can be removed from the recess 48 in an opposite direction than direction 62.

Referring to FIG. 2, the air conditioning assembly 58 and enclosure 60 houses air conditioning components as follows (left to right): a fan assembly 64, a refrigerant condenser 66, a refrigerant compressor 68, a second fan assembly 70, and a refrigerant evaporator 72. The housing enclosure 60 and the components therein can be described more clearly by referring to three portions thereof: a first or forward portion 74 nearest the engine compartment 16, a second middle portion 76, and a third or rearward portion 78 nearest the passenger compartment 22.

Portion 74 has an air inlet opening 80 (at the left in FIG. 2) for admitting air to the enclosure which air cools condenser 66. Fan assembly 64 is positioned downstream from the inlet opening 80 and draws air therein. The fan is preferably in the form of an elongated scroll. In FIG. 2, an electric motor 82 is positioned at a midpoint and powers the fan 64. The portion 74 has an open rearward facing end adapted to discharge the air flow from fan 64 into the middle portion 76. Portions 74 and 76 are connected by a relatively flexible duct 84 to facilitate the installation of the assembly into the recess and to allow easy access to the condenser 66.

The middle portion 76 houses the condenser 6 at the forward open end so that it receives cooling air from the fan 64. An inclined wall or partition 86 directs the air flow into a downward direction. Insulation 88 on the partition inhibits heated air from heating the remainder of the middle portion. Forward of the intersection of the partition 86 and the lower floor of the enclosure 60, a condenser air opening 90 is formed through the enclosure to accept the discharge air from the condenser. The heated air from the condenser flows through the opening 90 and into the engine compartment 16 for eventual discharge and mixture with the outside ambient air.

The electric motor driven refrigerant compressor 68 is positioned rearwardly of the partition 86. The compressor 68 is connected by a conduit or tube 92 to an expansion device 94 which in turn is connected to the evaporator 72 for delivering low pressure liquid refrigerant thereto as best shown in FIG. 2. The evaporator 72 is positioned to the rear of the middle portion and receives air through an openings 96 from the outside and openings 98 from the passenger compartment 22 as shown in FIG. 2. The air is drawn through the openings 96 and/or 98 by the electric motor powered fan assembly 70 which then pumps the air through the evaporator 72 for cooling. The upper opening 96 aligns with a duct or inlet 96' in the panel 46 to admit outside air. As best shown in FIG. 1, the flow A of outside air is supplied through a grill opening 96" at the base of windshield 20. A pivotal valve 97 controls the air flow and can be closed to provide only recirculated passenger compartment air. The pivotal valve 97 could be replaced with a pair of diverter doors, one controlling the flow of air from the outside and the other controlling the flow of recirculated air from the passenger compartment. A heater 99 is located behind the evaporator 72 to reheat air to provide a desired temperature. The heater core can be a heat exchanger through which engine coolant is passed as used in today's production vehicles. A pair of hoses 101 carry engine coolant to the heater core 99.

The third portion 78 is integrally connected to the middle portion 76 and serves to receive cooled and/or reheated air from the evaporator 72 and heater 99. Portion 78 serves to direct air flow into and through one or more openings of the enclosure and in the panel 46 for delivery into passenger compartment 22. Specifically, the upper wall of the third portion has an opening 100 to allow air to flow through duct means 102 within the dashboard 26. A path extends to an elongated opening or slot 104 at the windshield base to defog and defrost the windshield with dehumidified air. Another path leads to an upper level outlet 106 in the dashboard. A pivotal air valve door 108 is selectively set by an air conditioning /heating control to select the path of the air to slot 104 and/or outlet 106. Another opening 110 in the lower wall of the enclosure 60 allows air to be directed downward into the lower regions of the passenger compartment 22 through a downwardly extending duct 112. Final openings 114 through the opposite side walls of the enclosure direct air through ducts in the dashboard to be discharged from the right and left side of the dashboard as is normally provided in today's vehicles.

As is evident from FIGS. 1 and 2, the openings through the enclosure 60 conform or align with similar openings in the panel 46. This permits the assembly 58 with enclosure 60 to be readily installed/removed from the recess without attaching/disconnecting duct work for air flow as in conventional air conditioning systems. As the subject system is electric motor powered, the only connections from the enclosure to the vehicle are electrical lines and the two engine coolant hoses 101. Thus, the unit can be easily installed/removed.

Although only one specific embodiment of the air conditioning/heater assembly has been illustrated and described in detail, modifications or changes within the definition of the invention are contemplated which would still fall within the scope of the invention as defined by the following claims.

What is claimed is as follows:

1. A motor vehicle with interior body panel means between a front engine compartment and more rearward passenger compartment, the interior body panel means defining a deep recess opening to the engine compartment for insertive mounting of an improved unitary air conditioning assembly therein from the engine compartment, the assembly including a housing enclosure conforming dimensionally with the recess to permit ready installation or removal of the enclosure into the recess from the engine compartment; the housing enclosure supporting an electric motor powered refrigerant compressor, a refrigerant condenser, a refrigerant evaporator, a first electric motor powered fan to cause air to flow from outside the vehicle and through the condenser, a second electric motor powered fan to cause air to flow through the evaporator and into the passenger compartment; the housing enclosure defining openings therethrough including a condenser inlet opening for receiving outside air, a condenser outlet opening for discharging air after passing through the condenser, an evaporator inlet opening for receiving air mostly from the passenger compartment, and an evaporator outlet opening for discharging air from the evaporator back into the passenger compartment; the interior body panel means having openings corresponding to openings in the housing enclosure so that when the unitary air conditioning assembly is installed within the recess, the condenser outlet, evaporator inlet and outlet openings of the housing enclosure align with appropriate openings in the interior body panel means to permit air flow therethrough.

2. The vehicle air conditioning assembly set forth in claim 1 in which the recess opens to the engine compartment above the top portion of the engine so that the assembly can be moved into and from the recess without interference from the engine structure.

3. The vehicle air conditioning assembly set forth in claim 1 in which devices to control the flow of air are exteriorly with respect to the housing enclosure.

4. An improved air conditioning assembly including an electric motor powered refrigerant compressor, a refrigerant condenser, a refrigerant evaporator, a first electric motor powered fan to draw air from outside the vehicle and through the condenser, a second electric motor powered fan to draw air primarily from the vehicle passenger compartment through the evaporator and back into the passenger compartment, the improvement comprising: a housing enclosure including forward, middle and rearward portions; the forward portion defining an air inlet for the condenser and having the first electric motor powered fan therein for drawing outside air through the air inlet and discharging the air to the condenser; the middle portion supporting the condenser and having an air outlet opening and means including a flow directing partition to direct air to the outlet opening; the middle portion of the housing enclosure having the evaporator therein and with an evaporator air inlet to receive a flow of air primarily from the vehicle's passenger compartment, the second electric motor powered fan being supported in the middle portion to draw air from the evaporator air inlet and pass the air through the evaporator; the rearward portion receiving air from the middle portion and having at least two air outlet openings permitting directing air from the evaporator into the passenger compartment at different locations.

5. The air conditioning assembly set forth in claim 4 in which the enclosure is configured and adapted to be supported in a recess opening to the engine compartment so that the assembly may be insertably mounted through the engine compartment without interference from engine structure.

6. The vehicle air conditioning assembly set forth in claim 4 including a vehicle with air flow control devices located exteriorly with respect to the housing enclosure.

* * * * *

UNITED STATES PATENT AND TRADEMARK OFFICE
CERTIFICATE OF CORRECTION

PATENT NO. : 5,222,372
DATED : June 29, 1993
INVENTOR(S) : DeRees, et. al.

It is certified that error appears in the above-indentified patent and that said Letters Patent is hereby corrected as shown below:

On the Title page, item [73], Assignee:   insert--Chrysler Corporation--.

Signed and Sealed this

Twenty-eighth Day of June, 1994

Attest:

BRUCE LEHMAN

*Attesting Officer*    *Commissioner of Patents and Trademarks*